G. O. HODGE.
POWER OPERATED TRACTOR.
APPLICATION FILED JUNE 21, 1921.
1,403,080.
Patented Jan. 10, 1922.
3 SHEETS—SHEET 2.
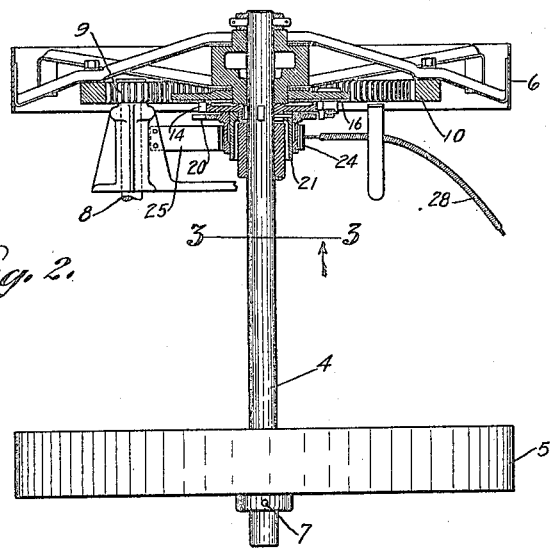
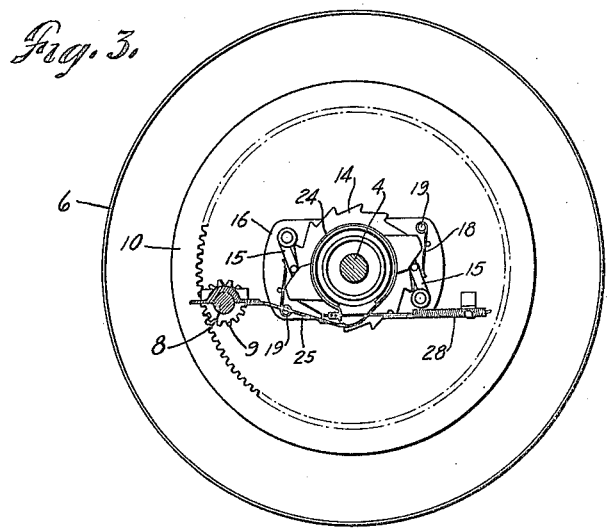
INVENTOR.
ATTORNEY.

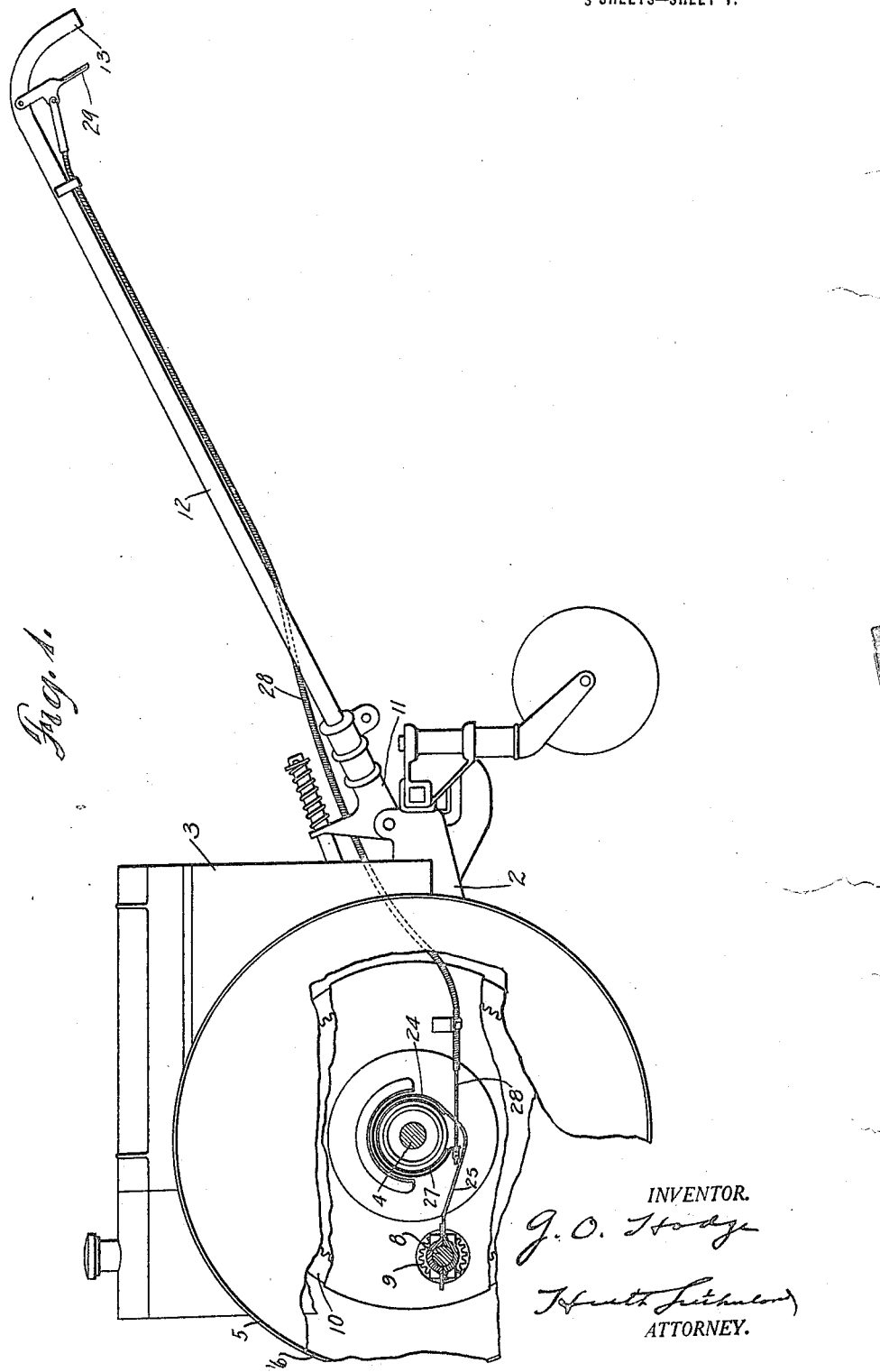

G. O. HODGE.
POWER OPERATED TRACTOR.
APPLICATION FILED JUNE 21, 1921.

1,403,080.

Patented Jan. 10, 1922.
3 SHEETS—SHEET 3.

INVENTOR.
J. O. Hodge
BY
ATTORNEY.

UNITED STATES PATENT OFFICE.

GEORGE O. HODGE, OF BRISTOL, CONNECTICUT, ASSIGNOR TO THE NEW BRITAIN MACHINE COMPANY, OF NEW BRITAIN, CONNECTICUT, A CORPORATION OF CONNECTICUT.

POWER-OPERATED TRACTOR.

1,403,080. Specification of Letters Patent. Patented Jan. 10, 1922.

Application filed June 21, 1921. Serial No. 479,277.

*To all whom it may concern:*

Be it known that GEORGE O. HODGE, a citizen of the United States, residing at Bristol, in the county of Hartford and State of Connecticut, has invented certain new and useful Improvements in Power-Operated Tractors, of which the following is a specification.

This invention relates to power-operated tractors such as are usable in connection with various kinds of farming implements as for instance cultivators, plows and weeders merely several of many examples.

I have several objects in view, among them being the provision of simple, efficient and readily-operated means by which the tractor may be easily and quickly turned by its own power after it has travelled a certain distance. This is accomplished by putting one of several (usually two) ground wheels with which the frame of the tractor is equipped, out of power-transmitting relation with the power means on the tractor frame of whatever character the same may be, it generally being a gasolene engine or motor. When the turn is to be made, and when one of these wheels is thrown out of driving relation with the power, the other still in driving relation with such power and on its rotation, effects the turning of the tractor. Generally the frame of the tractor is provided with two of these traction wheels and it is also furnished preferably with rearwardly - extending controlling handles which are usually grasped at their rear ends by the individual in charge of the tractor there desirably being means within reach of one of his hands by which one of the traction wheels can be put into and out of power-transmitting relation with the motor or engine, at will. The means by which this result is secured involves a clutch which is desirably of pawl and ratchet nature.

In the drawings accompanying and forming part of the present specification, I have shown in detail one of the several forms of embodiment of the invention which to enable those skilled in the art to practice the same will be set forth fully in the following description. Clearly I am not restricted to this disclosure. I may depart therefrom in several respects within the scope of the invention defined by the claims following said description.

Referring to said drawings:

Figure 1 is a side elevation with parts broken away and in section, of a tractor provided with turning mechanism involving the invention.

Fig. 2 is a top plan view of the axle and its wheels one of the latter being in central horizontal section.

Fig. 3 is a cross section on the line 3—3 of Fig. 2, looking in the direction of the arrow.

Figure 4:
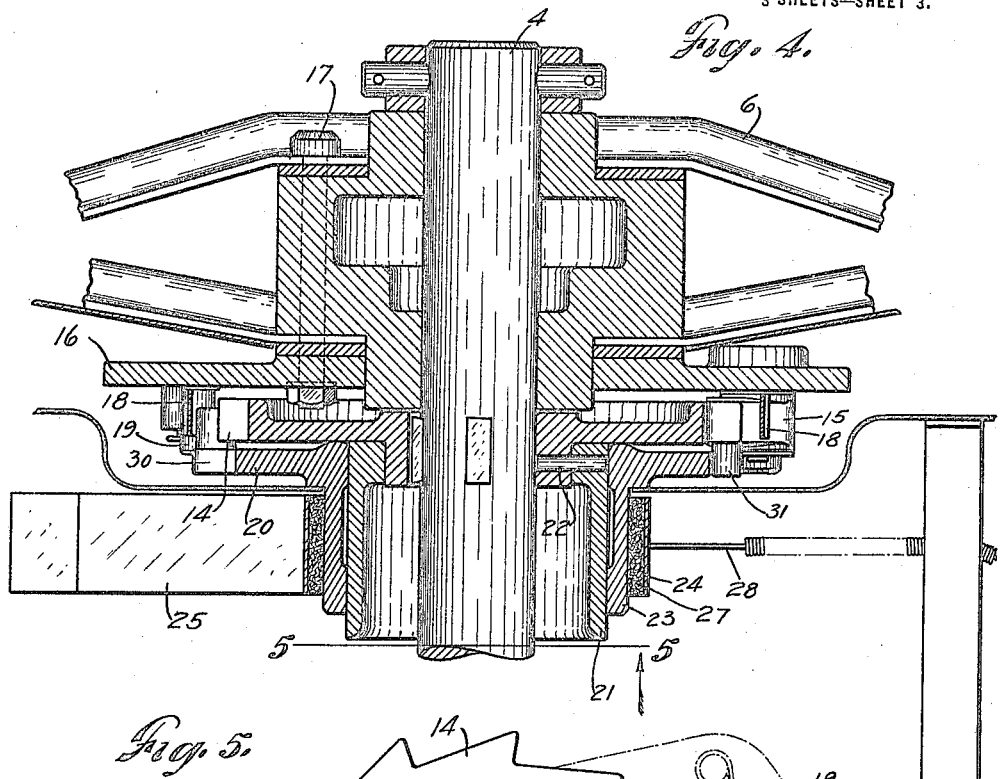
Fig. 4 is a horizontal section of the central portion of the wheel shown in the upper part of Fig. 2 and certain cooperating devices.
Figure 5:
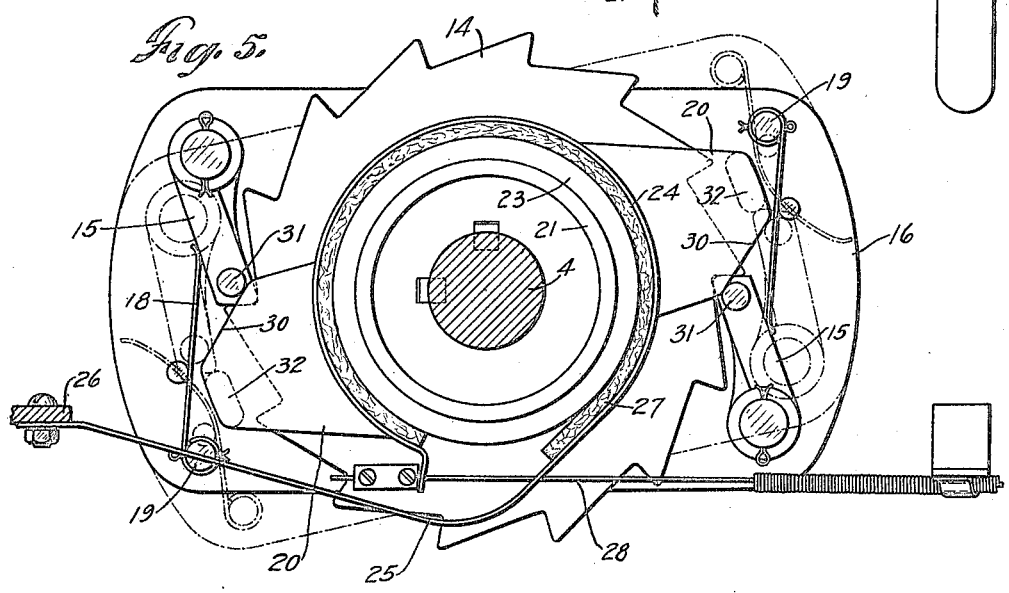
Fig. 5 is a transverse section on the line 5—5 of Fig. 4, looking in the direction of the arrow.

Like characters refer to like parts throughout the several views which are on different scales, the scale of Figs. 4 and 5 for instance being very much larger than that of the other views.

The tractor shown comprises in its make-up a frame such as that denoted in a general way by 2 and carrying an engine or motor which is generally of gasolene type and which is housed or enclosed by the casing 3. The frame also has bearings or blocks for rotatively supporting an axle as 4 the extended ends of which support the traction wheels 5 and 6. Although these wheels may be related with the axle 4 or equivalent means in any desirable way and although the axle may be associated with the frame in any convenient way, yet the axle is ordinarily rotary. Usually the wheel 5 is fixed to its end of the axle and it may be held thereto in some suitable way as by the pin 7. Although the wheel 6 is loose on the axle it is adapted to be clutched thereto and when the clutch is in active relation the wheel 6 in effect becomes rigid with the axle 4 so that on turning of the wheel 6 the axle 4 and consequently the wheel 5 will be turned in unison.

Through the action of suitably-governed means, the wheels 6 can be uncoupled or unclutched from the axle for instance when it is desired to effect the turning of the tractor at the conclusion of a predetermined movement, as I will more particularly hereinafter explain.

From the engine there is associated a power-transmitting shaft as 8 having connected with it as shown the pinion 9 the teeth of which mesh with the internal teeth of a circular gear 10 rigid with the traction wheel 6 so that if the clutch to which I have alluded be in effective relation and if the engine be in motion the shaft 8 will be driven to effect the rotation of the wheel 6 and the latter the axle 4 and wheel 5 to propel the vehicle. Hereinafter I will explain more fully the clutching mechanism which I have shown in the drawings.

As represented the frame 2 of the tractor may have pivoted to it for movement about a horizontal transverse axis, the bearing or bracket 11 having sockets in which are fitted tightly the controlling handles 12 which diverge rearwardly and terminate at their back ends in handle or grasping portions 13 which are usually downbent and which may be held by the attendant of the tractor as the latter is moved across the field through the power of the engine of the tractor and the operator usually standing between the rear end portions of the two controlling handles 12.

As shown the axle 4 has fastened to it in adjacence to the wheel 5 the ratchet wheel 14 the peripheral teeth of which are co-operative with pawl mechanism involving as shown diametrically-opposite pawls as 15, there being two of these pawls pivotally connected as illustrated at diagonally-opposite points on a pawl-carrier as 16 which is represented as in the form of a practically elongated, rectangular plate united as by bolts 17 to the hub of the loose wheel 6 as shown best in Fig. 4 the plate 16 having a practically central opening in which is fitted the lateral portion of the hub of said loose wheel 6 as shown in Fig. 4. The pawls 15 may be maintained in operative relation in any convenient way as by springs 18 which are shown for the purpose, the springs being coiled at their butts around diagonally-opposite pins 19 on the pawl-carrier or plate 16 as shown for instance in Fig. 5 and bearing at their rounded free ends against the respective pawls 15 as best shown in Fig. 5.

It will be assumed that the pawls 15 are in engagement with the ratchet wheel 14 as shown by full lines in said Fig. 5 and that the shaft 8 is being turned. Owing to this condition the wheel 6 will be rotated and by reason of the pawl and ratchet connection between it and the axle 4, the latter and consequently the wheel 5 will be rotated to effect the propulsion of the tractor. By throwing the pawls out of engagement with the ratchet wheel 14 as shown by dotted lines in Fig. 5, the wheel 6 will be turned by power and although it rotates on the axle 4 said axle and consequently the wheel 5 will not be rotated by such power, in view of which condition the tractor may be turned through the action of the power-rotated wheel 6 and when the turn has been accomplished the pawls 15 will be caused to automatically engage the ratchet wheel 14 at which point the power driven wheel 6 is put into coupled relation through the axle 4, with the complemental wheel 5.

The actuating means for throwing the pawls 15 out of engaging relation with the ratchet wheel 14 may be of any suitable nature but as represented it involves an actuator such as the plate 20 having a central opening to receive a barrel or sleeve 21 fastened as by one or more pins 22 to the inwardly-extending hub of the ratchet wheel 14 as shown in Fig. 4. The actuator or plate as shown has an inwardly-extending hub 23 around which is fitted the band 24 one end of which has an extension 25 connected to a fixture as 26 the other end of the band 24 surfaced on its inner or active side with felt or some suitable material as 27, being united with a connector as 28 extended backwardly therefrom and flexibly connected as by pivoting, to the finger-piece 29 pivotally supported on the appropriate handle 12 or grasping portion 13. The actuator 20 has at obliquely opposite corners the actuating portions 30.

It will be assumed that both pawls 15 are in engagement with the ratchet wheel 14 as shown by full lines in Fig. 5 and that the shaft 8 is in action. This results in the concurrent rotating of both wheels 5 and 6 in the manner hereinbefore described so that the tractor may for example be driven across the field.

When the connector 28 is drawn back through the action of the finger piece 29 the band 24 is constricted on the hub 23 thus retarding the rotation of the actuator or plate 20 with the wheel 5 so that as the wheel continues to turn the operating portions 30 of the actuator by engaging the studs 31 on the pawls will push the stud outward and therefore disengage them from the ratchet wheel 14 so that the wheel 6 can then turn without operating the axle 4.

Upon the actuator or plate 20, are lugs or outward extensions as 32 which are adapted to engage the free ends of the pawls 15 when the cam surfaces 30 have moved the pawls out of engagement with the ratchet wheel 14. This positive driving of the actuator or plate 20 by the pawls 15 against the frictional retarding due to the brake-band 24, continues as long as the grip 29 is grasped for turning.

What I claim is:

1. A power operated tractor comprising ground wheels a pawl-and-ratchet clutch interposed between the ground wheels, and means under the control of the attendant of the tractor, for putting the pawl and ratchet members of the clutch into and out of active relation with each other, whereby the ground wheels may be put into and out of driving relation with one another at will.

2. A power-operated tractor comprising ground wheels, a pawl-and-ratchet clutch betweeen the ground wheels, means for driving one of the ground wheels, and means accessible by the attendant of the tractor, for putting the pawl means into and out of driving relation with each other whereby the ground wheels may be connected or disconnected at will.

3. A power-operated tractor comprising an axle having ground wheels one of which is loose on the axle and the other of which is rotative therewith, a ratchet also rotative with the axle, a pawl mounted on the loose wheel, and means under the control of the attendant of the tractor, for causing the pawl to engage or disengage the ratchet.

4. A power-operated tractor comprising an axle having ground wheels one of which is loose thereon and the other of which is rotative therewith, a ratchet also rotative with the axle, a pawl mounted on the loose wheel, a spring for holding the pawl normally engaged with the teeth of the ratchet, and means under the control of the attendant of the tractor, for disengaging at will, the pawl from the ratchet.

5. A power-operated tractor comprising an axle having ground wheels one of which is loose thereon and the other of which is rotative therewith, a ratchet also rotative with the axle, a pawl mounted on the loose wheel, controlling handles connected with the frame of the tractor and to be grasped by the attendant thereof, and means on one of the handles, for causing the pawl to engage or disengage the ratchet.

6. A power-operated tractor comprising an axle having ground wheels one of which is loose thereon and the other of which is rotative therewith, a ratchet also rotative with the axle, a pawl mounted on the loose wheel, controlling handles connected with the frame of the tractor and to be grasped by the attendant thereof, a connector mounted for movement on one of the controlling handles, a manually-operable device on one of the handles and connected with the rear portion of the connector and means actuated by the forward portion, of the connector for disengaging the pawl from the ratchet.

7. A tractor the frame of which has an axle, ground wheels one loose on the axle and the other rotative therewith, power operated means for rotating the loose ground wheel, a ratchet rotative with the loose wheel, a pawl cooperative with the ratchet, and means operated by the power of the loose wheel, for causing at will the pawl to be moved out of engagement with the ratchet.

8. A tractor the frame of which has an axle, ground wheels carried by the axle and one of them being loose thereon, power operated means for rotating said loose ground wheel, a ratchet rotative with the axle, a pawl mounted on the loose wheel, an actuator loosely rotative with the loose wheel, and means for preventing the rotation of the actuator with the loose wheel and at the same time causing the actuator to throw the pawl out of engaging relation with the ratchet.

9. A tractor the frame of which has an axle, ground wheels, carried by the axle and one of them being loose thereon, power operated means for rotating the loose ground wheel, a ratchet rotative with the axle, a pawl mounted on the loose wheel, an actuator loosely frictionally with the loose wheel, and a friction band around the actuator and settable at will to prevent the rotation of the actuator with the loose wheel to thus cause the actuator to throw the pawl out of engaging relation with the ratchet.

10. A tractor the frame of which has an axle, ground wheels carried by the axle, one of them being loose thereon, power-operated means for rotating the loose ground wheel, a ratchet rotative with the axle, a pawl mounted on the loose wheel, an actuator loosely rotative with the loose wheel, and a friction band around the actuator, controlling handles, connected with the frame, and means on one of the handles, for causing the friction band to grip the actuator and thus prevent its rotation with the axle to thereby cause the actuator to throw the pawl out of engaging relation with the ratchet.

In testimony whereof I affix my signature.

GEORGE O. HODGE.

Witnesses:
HEATH SUTHERLAND,
Q. J. WATERS.